United States Patent [19]

Ruhnau et al.

[11] 4,106,820
[45] Aug. 15, 1978

[54] CIRCUIT ARRANGEMENT FOR PERIODICALLY TESTING THE OPERATING RELIABILITY OF AN ELECTRONIC ANTISKID CONTROL SYSTEM

[75] Inventors: Gerhard Ruhnau, Hannover; Lutz Weise, Misburg a.d.; Karl-Heinz Hesse, Gehrden, all of Fed. Rep. of Germany

[73] Assignee: WABCO Westinghouse GmbH, Hannover, Fed. Rep. of Germany

[21] Appl. No.: 814,077

[22] Filed: Jul. 11, 1977

[30] Foreign Application Priority Data

Jul. 14, 1976 [DE] Fed. Rep. of Germany ....... 2631569

[51] Int. Cl.² .............................................. B60T 8/00
[52] U.S. Cl. .................................. 303/92; 340/52 B; 340/515
[58] Field of Search ....................... 303/92; 324/73 R; 340/52 B, 53, 214, 410, 411; 235/153 A, 153 AC, 302.1

[56] References Cited

U.S. PATENT DOCUMENTS 3,806,202  4/1974  Ochiai ................................. 303/92
3,818,433  6/1974  Okamoto et al. .................. 303/92 X Primary Examiner—Stephen G. Kunin
Attorney, Agent, or Firm—R. W. McIntire, Jr.

[57] ABSTRACT

A checking circuit for periodically monitoring the electronic operating reliability of a vehicle antiskid control system during periods of operation, as well as prior to operation, by injecting a periodic test pulse into the system control channel. An evaluation circuit detects the transmission of the test pulse by the control channel and output amplifier as an indication of the ability of the electronic devices to effect a subsequent energization of the system modulator valve at the time of de-energization thereof, or de-energization of the system modulator valve at the time of energization thereof. A warning device is activated in the absence of a test pulse transmission within a predetermined time duration following generation thereof.

19 Claims, 9 Drawing Figures

4,106,820

CIRCUIT ARRANGEMENT FOR PERIODICALLY TESTING THE OPERATING RELIABILITY OF AN ELECTRONIC ANTISKID CONTROL SYSTEM

BACKGROUND OF THE INVENTION

The invention relates to a circuit arrangement for the periodic testing of the operating reliability of an electronic antiskid control system which, by means of appropriate control signals, influences the pressure-medium operated brake device of a vehicle, in particular of a road vehicle, by energizing or de-energizing the magnet of an electro-pneumatic modulator valve.

In such systems it is necessary, from time to time or also continually during various operating conditions of a vehicle, such as during braking, to check the operating reliability of the electronic switching means, which serve the purpose of controlling the modulator valve solenoids.

In order to meet these requirements it is known to use a monitoring device wherein by short-circuiting speed sensors there is generated a simulated control signal, followed by checking as to whether the system responds to the signal so produced.

In such a device it is a disadvantage that such control signals, which thus simulate a locking of the respective wheel, can be produced only above a certain wheel or vehicle speed, and for this reason it is not possible to perform a checking at lower speeds.

There is also known a circuit arrangement for checking the operating reliability of an antiskid control system which enables a checking as to the proper functioning of the antiskid system only before starting to drive. With this antiskid control system it is a disadvantage that there is no possibility of checking while driving.

Generally, the known arrangements provide for only one monitoring possibility with respect to an inadmissible switching time. Accordingly, in this way an error is only detected after the inadmissible switching time and not beforehand.

SUMMARY OF THE INVENTION

The object of the present invention, therefore, is to provide a circuit checking arrangement which affords a uniform periodic testing of the operational reliability of an electronic antiskid control system at any moment and in any operating condition of a vehicle, regardless of the response time of the respective modulator valve magnets and regardless of any operating requirements of the vehicle.

This object is reached according to the invention in that there is provided a test-pulse generating circuit which produces the test pulses which are transmitted, during a certain time period, via an energizing input or a de-energizing input of a control channel and a subsequent output amplifier, and in that there is provided an evaluation circuit which actuates a subsequent warning device in the event of a preset time duration being exceeded, due to a system malfunction rendering transmission of the respective test pulses at the wrong moment or not at all.

The advantages obtained by the invention reside in the fact that particularly during, as well as before or after the magnet-actuating time, it is possible to determine whether the magnet is actuated by a defective output amplifier and/or by defective electronic means preceding the latter, and in the fact that the test pulses have priority over control signals, but have such a short time duration that in spite of an interruption of the control signals from the analyzing electronic means to the modulator valve magnets, the latter cannot be influenced by the test pulses. It is possible to test the electronic antiskid system as to its operating reliability during any operating condition, that is, during any braking condition, when driving without braking, as well as when standing still.

BRIEF DESCRIPTION OF DRAWINGS

An exemplified embodiment of the invention is shown in the accompanying drawings in which.

DESCRIPTION AND OPERATION

Figure 1:
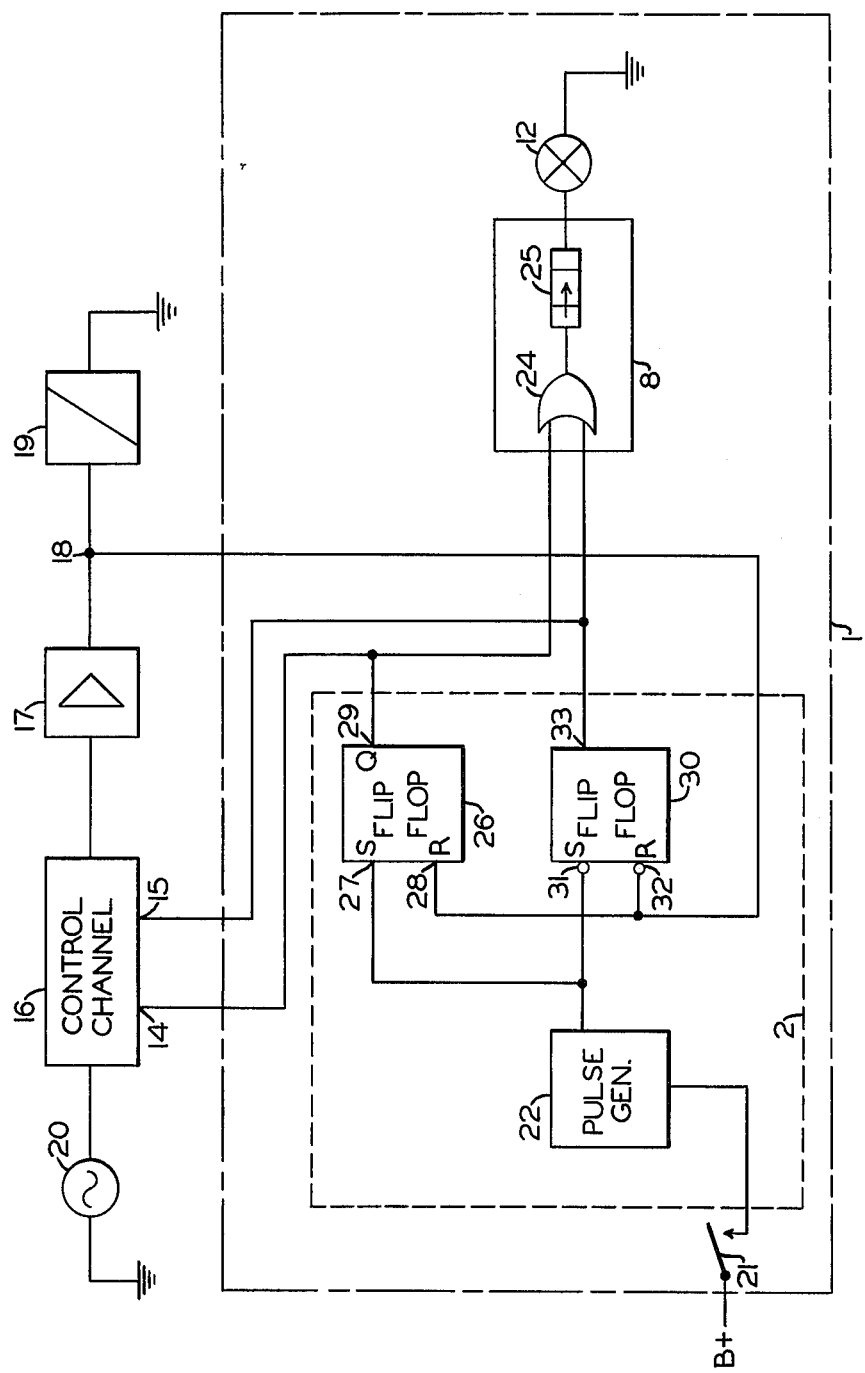
FIG. 1 is a block diagram showing an electronic antiskid system having a test circuit consisting of a testpulse generating circuit and an evaluation circuit.

A test circuit 1 is associated with an electronic antiskid system that includes a control channel 16, an output amplifier 17, a magnet 19 for an electro-pneumatic modulator valve, as well as a sensor 20 which senses the angular speed of a vehicle wheel.

The test circuit 1 is provided in several forms which basically function in the same manner. The test circuit 1 is connected with the electronic antiskid system via an energizing input 14 and a de-energizing input 15 of control channel 16, as well as with a junction 18 between the output amplifier 17 and modulator valve magnet 19.

Figure 2:
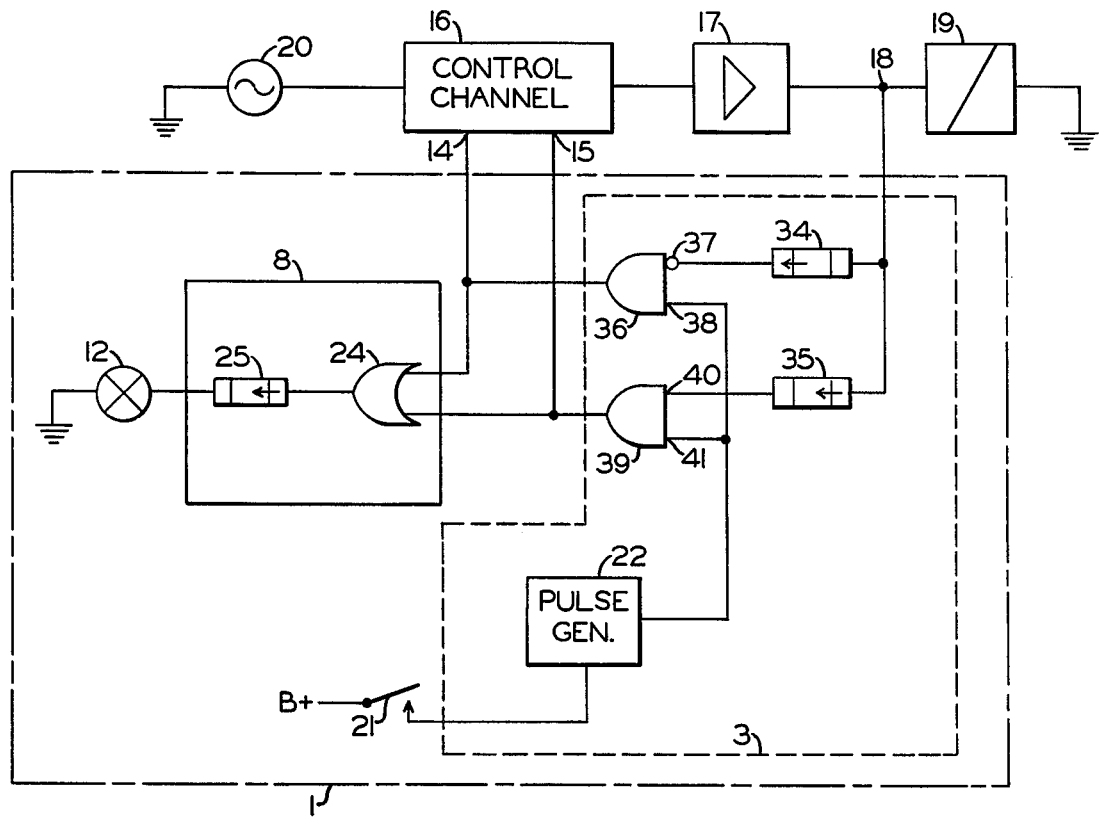
FIG. 2 is a block diagram showing an electronic antiskid system having the same evaluation circuit as in FIG. 1, but with a different arrangement of the test-pulse generating circuit.
Figure 5:
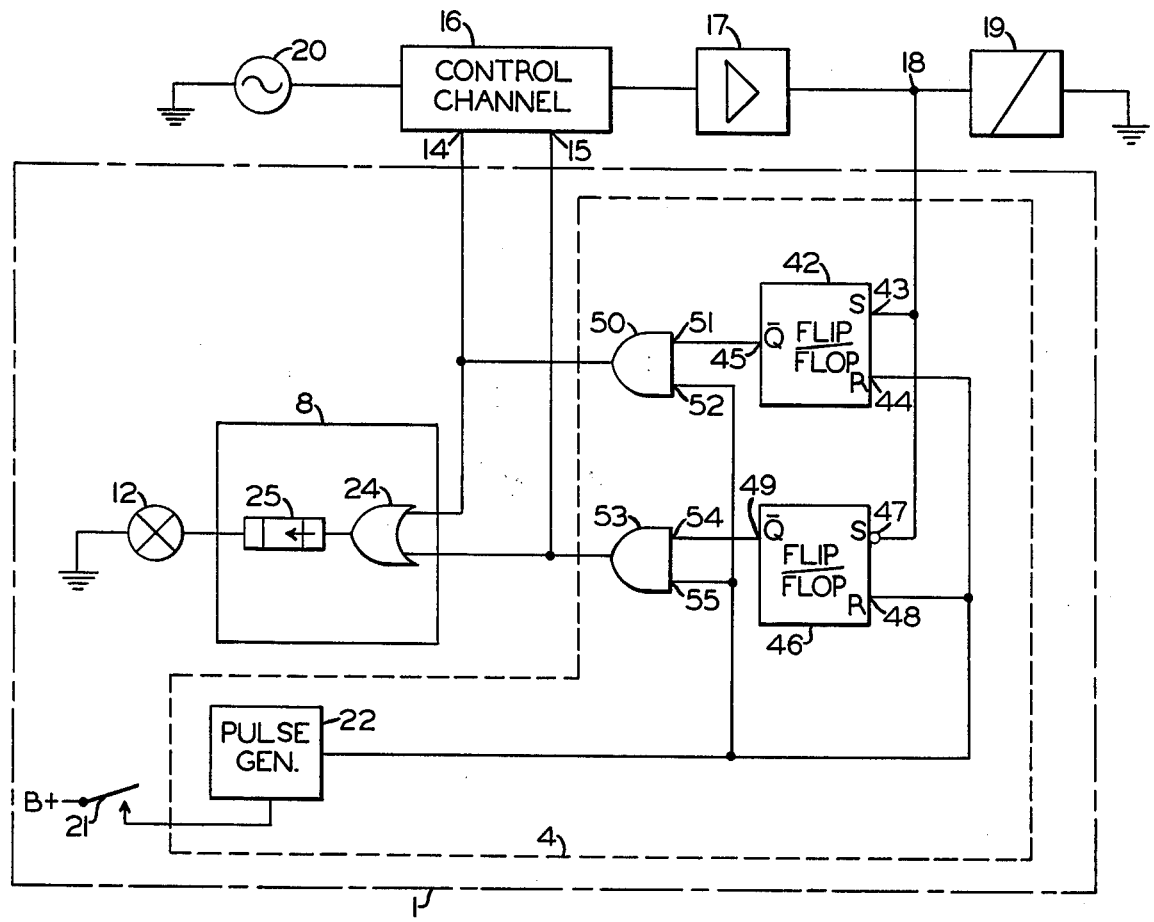
FIG. 5 is a block diagram showing an electronic antiskid system similar to FIGS. 1 and 2, but wherein the test-pulse generating circuit has a different arrangement.

In accordance with the FIGS. 1, 2, and 5, the test circuit 1 includes, respectively, a test-pulse generating circuit 2, 3, and 4 having an arrangement which is different in each case, and an evaluation circuit 8, which is identical in each case. On the other hand, according to the FIGS. 6, 7, and 8, the test circuit 1 includes, respectively, an evaluation circuit 9, 10, and 11, which is different in each instance, and a test-pulse generating circuit 5, which has the same form in each case.

The test-pulse generating circuits 2 to 5 are connected with a stop light switch 21, via which a supply of power is provided at the time of a brake application. A warning device 12 is connected to the output of the evaluation circuits 8 to 11.

In the test-pulse generating circuit 2 of FIG. 1, there are provided two RS type flip-flops 26 and 30, and a pulse generator 22, which is connected with stop light switch 21. A common connection leads from the pulse generator 22 to a set input terminal 27 of flip-flop 26 and to an inverted input terminal 31 of flip-flop 30. A common connection leads from output 29 of flip-flop 26 to the energizing input 14 of control channel 16 and to an OR gate 24 in evaluation circuit 8. Likewise, a common connection leads from output 33 of flip-flop 30 to the de-energizing input 15 of control channel 16 and to OR gate 24 in the evaluation circuit. A common connection leads from junction 18 to an input terminal 28 of flip-flop 26 and to an inverted input terminal 32 of flip-flop 30.

In the evaluation circuit 8 of FIGS. 1, 2, and 5, the OR gate 24 is followed by a timing element 25, which has a delay on pull-in characteristic. A modified form of the test circuit 1 is, according to FIG. 2, provided with a test-pulse generating circuit 3, wherein there is provided a common connection leading from pulse generator 22 to an input 38 of an AND gate 36 and to an input 41 of an AND gate 39. A second, inverted input 37 of AND gate 36 is connected with a timing element 34 having a delay on drop-out characteristic. A second input 40 of AND gate 39 is similarly connected with a timing element 35, which has a delay on pull-in characteristic. Both timing elements 34 and 35 are jointly connected with junction 18 between output amplifier 17 and modulator valve magnet 19. The AND gate 36 is connected with both OR gate 24 and the energizing input terminal 14 of control channel 16. Similarly, AND gate 39 is connected with both OR gate 24 and the de-energizing input terminal 15 of the control channel 16.

As shown in FIG. 5, another form of test circuit 1 is provided with a test-pulse generating circuit 4, wherein the pulse generator 22 is connected, respectively, with an input 55 of an AND gate 53, an input 52 of an AND gate 50, an input terminal 48 of an RS type flip-flop 46 and an input terminal 44 of an RS type flip-flop 42. The junction 18 is connected with both an input terminal 43 of flip-flop 42 and an inverted input terminal 47 of flip-flop 46. An inverted output terminal 45 of flip-flop 42 is connected with a second input 51 of AND gate 50 in the same way as an inverted output terminal 49 is connected with a second input 54 of AND gate 53. Furthermore, AND gate 50 is connected with both OR gate 24 and the energizing input terminal 14 of the control channel, while AND gate 53 is connected to both OR gate 24 and the de-energizing input terminal 15 of the control channel.

Figure 6:
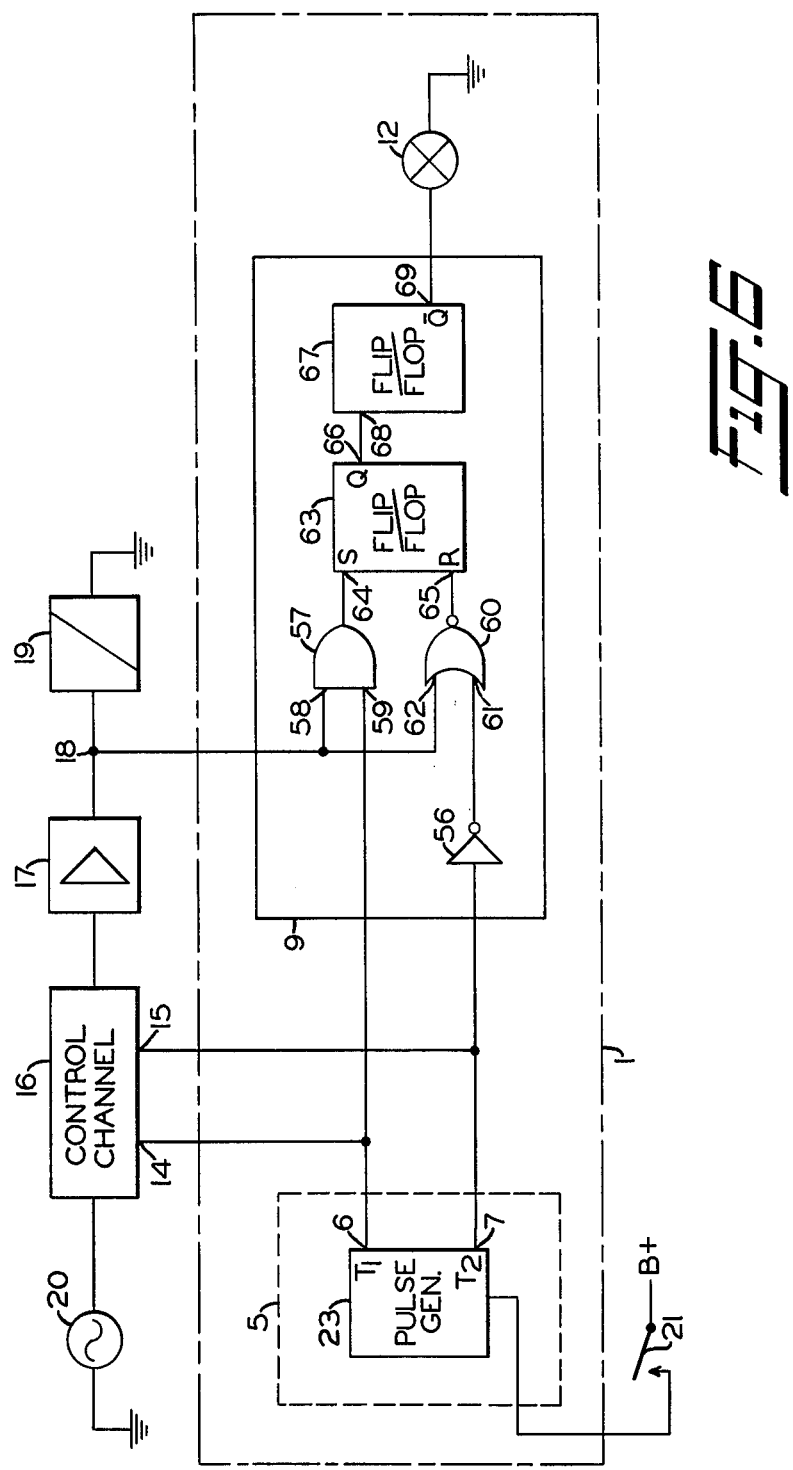
FIG. 6 is a block diagram showing a test circuit having still a different test-pulse generating circuit and an associated evaluation circuit.
Figure 7:
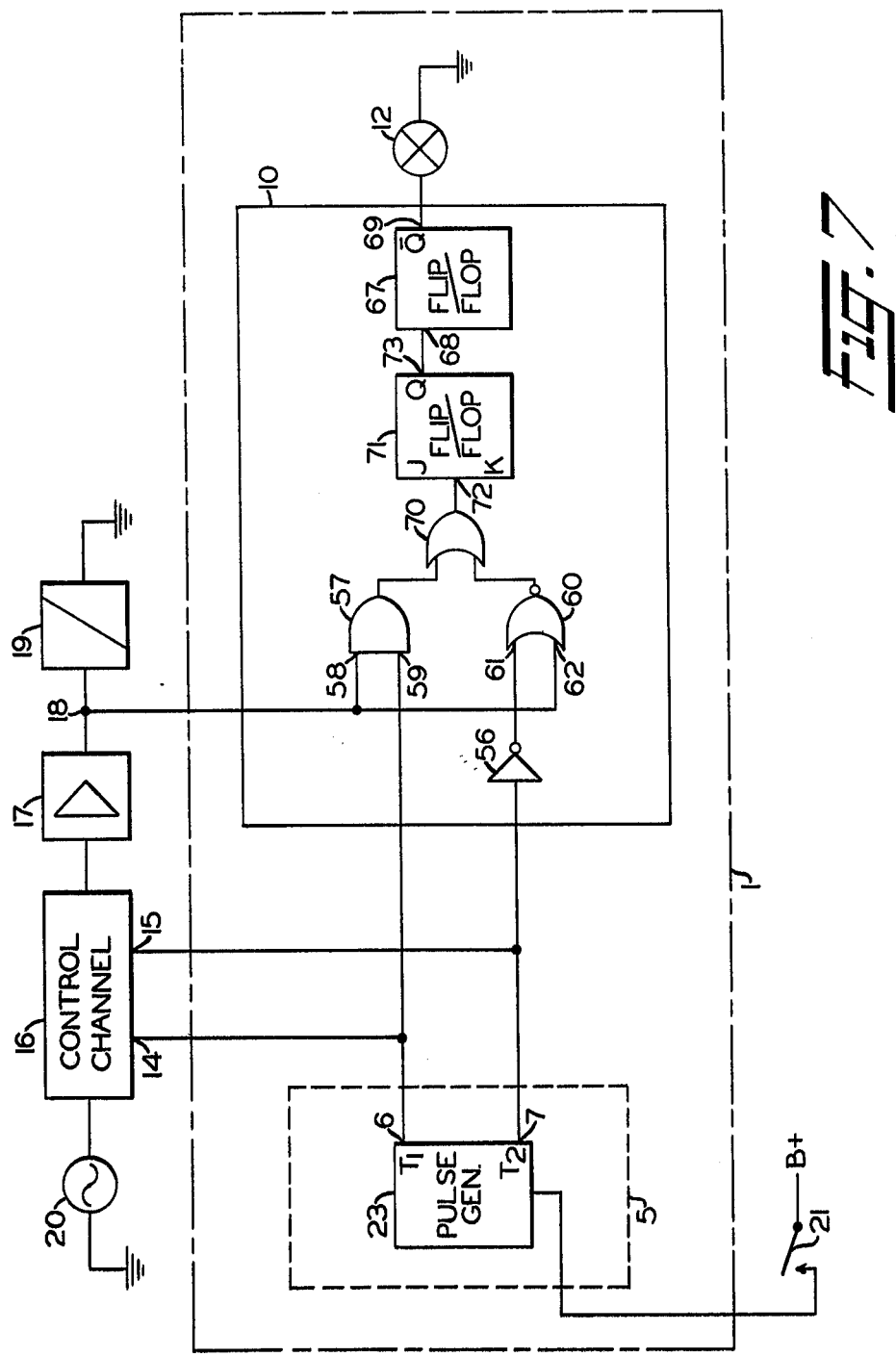
FIG. 7 is a block diagram showing the same test-pulse generating circuit as FIG. 6, but with another arrangement of the evaluation circuit.
Figure 8:
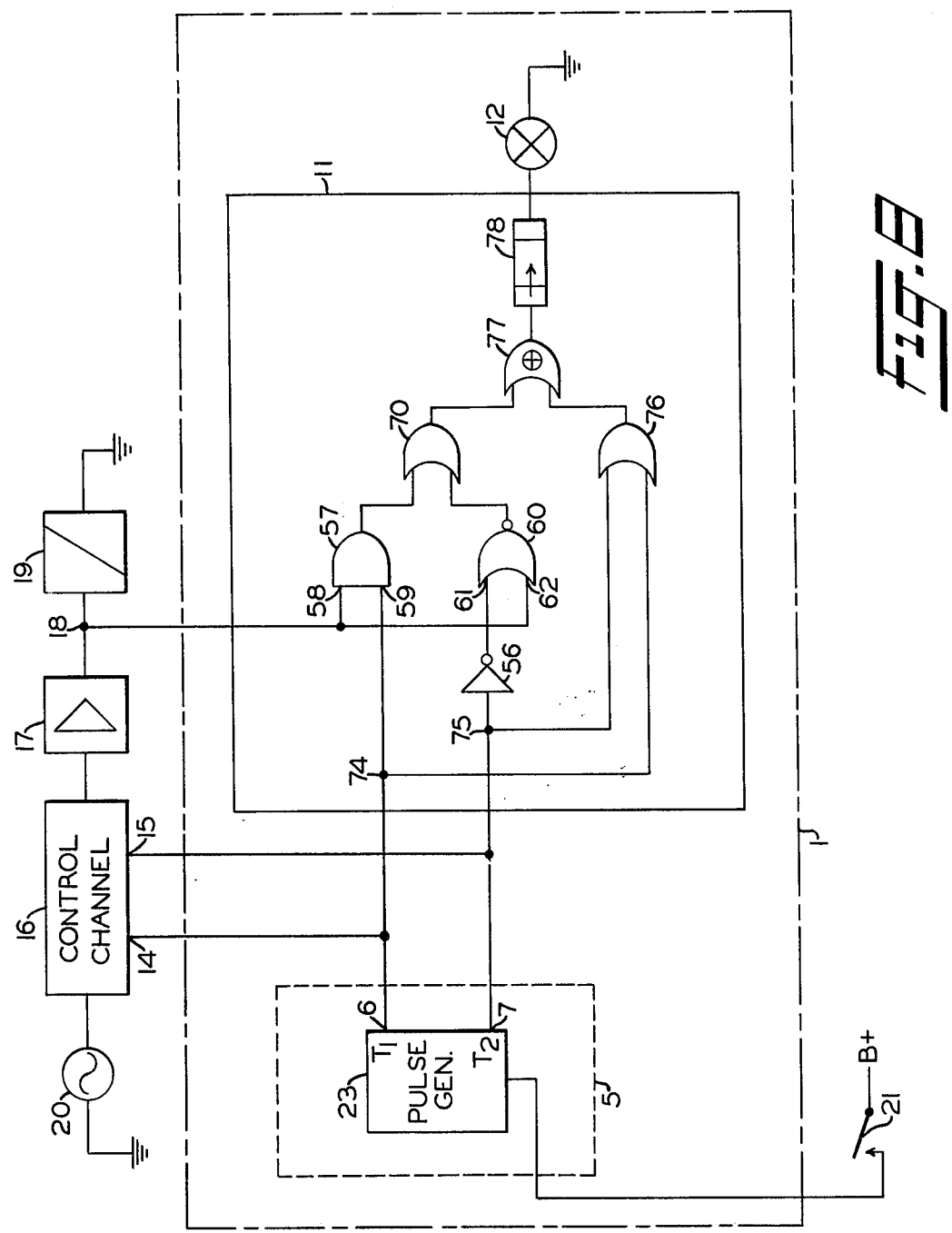
FIG. 8 is a block diagram showing a test circuit in which the evaluation circuit has still another arrangement differing from FIGS. 6 and 7.

In the test circuit 1 as shown in the FIGS. 6, 7, and 8, on the other hand, there is provided an identical test-pulse generating circuit 5 in the form of a pulse generator 23 having two generator outputs 6 and 7 for producing two pulse waveforms $T_1$ and $T_2$, whose test pulses are utilized directly and are independent of one another. The generator output 6 is, in all instances, connected with both the energizing input terminal 14 of control channel 16 and an input 59 of an AND gate 57. The generator output 7 is in all instances connected with the de-energizing input terminal 15 of control channel 16 and at the same time, via an inverter 56, with the input 61 of a NOR gate 60.

In the evaluation circuit 11 of FIG. 8, in addition each generator output 6 and 7 is connected, via the junctions 74 and 75, with an OR gate 76.

In the evaluation circuits 9, 10 and 11 of the FIGS. 6, 7 and 8, a second input 58 of AND gate 57 and a second input 62 of the NOR gate 60 are both connected to junction 18.

In evaluation circuit 9, AND gate 57 is connected to an input terminal 64 of an RS type flip-flop 63, and a corresponding connection leads from NOR gate 60 to an input terminal 65 of the same flip-flop.

The output 66 of flip-flop 63 is connected with the trigger input 68 of a monostable flip-flop stage 67, which is the final element in the evaluation circuits 9 and 10. The evaluation circuit 10 contains ahead of the monostable flip-flop stage 67, an OR gate 70 and a JK type flip-flop 71 instead of the RS flip-flop 63. The OR gate 70 just mentioned is connected with AND gate 57 as well as with NOR gate 60, and is placed in circuit with these two gates. The OR gate 70 is connected to a trigger input 72 of the JK flip-flop 71, whose output 73 is connected to the trigger input 68 of the monostable flip-flop stage 67. An inverted output terminal 69 of the monostable flip-flop stage in the evaluation circuits 9 and 10 leads from the aforesaid evaluation circuits directly to the warning device 12.

OR gate 70 is connected to both the AND gate 57 and the NOR gate 60 in the evaluation circuit 11. OR gate 70 and OR gate 76 are each connected with a following exclusive OR gate circuit 77. Following the exclusive OR gate circuit 77, there is disposed a timing element 78, which exhibits a delay on pull-in characteristic. Being the last element in the evaluation circuit 11, timing element 78 is connected directly to the warning device 12.

The basic function of all the embodiments of the test circuit 1 resides, without exception, in the fact that, during all driving and/or operating conditions, there are produced, by means of a test-pulse generating circuit 2 to 5, test signals which — regardless of control signals which may be present — have priority over any signals originating from the antiskid control system and are transmitted through the control channel 16 as well as via the output amplifier, in order to determine, by feeding the corresponding pulses or test signals back to the test circuit 1, whether test signals produced periodically within predetermined time units (while taking into account the transmission times of the respective pulses through the aforementioned control channel 16 and the terminal amplifier 17), are transmitted through to the evaluation circuits 8, 9, 10 and 11.

The free-running pulse generator 22 of FIG. 1 produces an alternating voltage with a relatively long cycle duration. This voltage is admitted to the set input terminals 27 and 31 of flip-flops 26 and 30. The reset input terminals 28 and 32 of the RS type flip-flops 26 and 30 dominate with respect to the dynamic set inputs 27 and 31, since it is an advantage that these inputs have priority with respect to inputs 27 and 31.

Let it now be assumed, while considering FIG. 1, that there is only a low voltage signal effective at junction 18, hereinafter referred to as a logical "0" signal, as opposed to a high signal voltage hereinafter referred to as a logical "1" signal. In this case the RS flip-flop 30 cannot be set, since input 32 inverts the low voltage to a logical "1" signal to maintain the reset condition of this flip-flop, even when the set input 31 also goes to a logical "1" level, due to the fact that the reset input 32 is the dominant input. The RS flip-flop 26, however, is set by a positive edge of the alternating voltage produced by the pulse generator, since a logical "0" signal on the reset input terminal 28 of the RS flip-flop 26 cannot lead to a resetting of this RS flip-flop.

Accordingly, in the case here being considered, the RS flip-flop 26 can transmit, via its output 29, a logical "1" signal which, on the one hand, is sent through the OR gate 24 and thus, almost immediately starts the timing element 25 in evaluation circuit 8. Concurrently, the flip-flop output is fed to control channel 16 via the energizing input terminal 14, accordingly causing amplifier 17 to produce an output. Thus, a logical "1" signal is transmitted from output amplifier 17, via junction 18, to the reset input terminal 28 of RS flip-flop 26, whereby the latter is nearly instantly reset and the logical "1" signal coming from its output 29 disappears. A momentary, positive polarity, test pulse is thus generated whose duration is, however, insufficient to effect a response from modulator valve magnet 19 and therefore has no effect upon the antiskid control system except for purposes of checking its reliability. Moreover, provided the generated test pulse is extinguished before the time delay established by timing element 25 expires, warning device 12 will remain inactive, thereby indicating troublefree functioning of the respective electronic circuits comprising control channel 16 and of the output amplifier 17.

To clarify this again, the operating sequences described above relate primarily to an operating condition of the electronic antiskid device in which output amplifier 17 is in a de-energized state, since the sensed angular speed of the vehicle wheel is analyzed in the control channel 16 to establish that no antiskid control is required. By performing an anticipatory checking to determine whether the control channel 16 is able to properly convey an energization signal on the energizing input terminal 14 to the output amplifier 17 during this period and whether from the latter a resultant, troublefree operation is realized, the reliability of the antiskid control system is ascertained by the testpulse generating circuit 2.

Let it now be assumed, while still considering FIG. 1, that a logical "1" signal is present at junction 18, indicating operation of output amplifier 17. This is the case when due to slipping or locking of a vehicle wheel the sensor 20 brings about excitation of control channel 16 such as to provide a logical "1" signal at output amplifier 17.

As a result of the logical "1" signal at junction 18, the RS flip-flop 26 can no longer be set by a positive edge of the alternating voltage produced by the pulse generator 22, since — as already stated above — the reset inputs of the RS flip-flops 26 and 30 dominate and accordingly the presence of the logical "1" signal on the reset input terminal 28 precludes a setting of the RS flip-flop 26. The logical "1" signal has, however, no effect on the inverted reset input terminal 32 of RS flip-flop 30, since it is inverted to a logical "0" signal, whereby RS flip-flop 30 is subsequently set by the negative edge of the alternating voltage produced by pulse generator 22.

A logical "1" signal is transmitted from output 33 to the de-energizing input terminal 15 of the control channel 16, and to OR gate 24 via which timing element 25 is activated to initiate the timing period within which the control channel 16 and amplifier 17 must respond to reset the testpulse circuit and thereby suppress operation of warning device 12. The logical "1" signal on the de-energizing input terminal 15 of control channel 16 serves to disable output amplifier 17, so as to no longer provide a signal. Consequently, at junction 18, there is only a logical "0" signal which immediately resets the RS flip-flop 30 via its inverted reset input terminal 32, so that output 33 of RS flip-flop 30 only delivers a test pulse of such short term duration that in the event of slipping or locking of the vehicle wheels, it remains possible to deliver antiskid control signals for undisturbed control of modulator valve magnet 19.

In the arrangement of FIG. 2, AND gates 36 and 39 allow passage of a logical "1" signal from pulse generator 22 at their inputs 38 and 41 insofar as there is a required additional corresponding logical "1" signal on each of the associated inputs 37 and 40 of AND gates 36 and 39.

Figure 3:
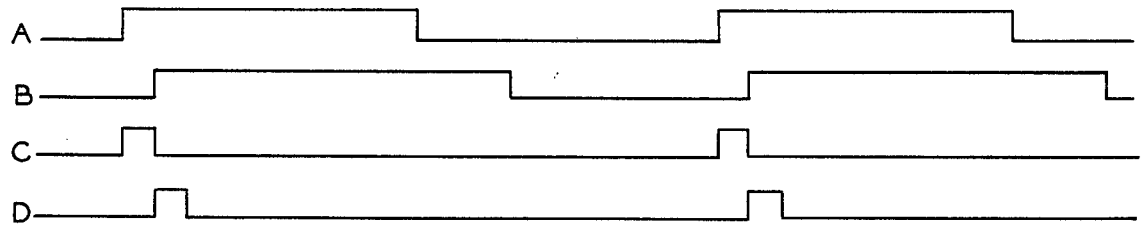
FIG. 3 is a graph showing waveforms representing appropriate time lapses when performing an energization check in the system according to FIG. 2.

Let it now be assumed, while considering FIGS. 2 and 3, that there is no voltage at the junction 18, that is, there is no control signal due to slipping or locking of the vehicle wheel coming from the sensor 20 and control channel 16, and consequently a checking as to the possibility of performing an energization is to be carried out.

The signal pattern A, as per FIG. 3, begins with a positive edge of the voltage of the pulse generator 22, i.e., with a logical "1" signal of the pulse generator.

Via input 38 of AND gate 36 with the inverted second input 37 being at a logical "1" level also, a logical "1" output is fed to the energizing input terminal 14 of the control channel 16 where, in accordance with the signal pattern C in FIG. 3, it is applied at practically the same time as the logical "1" signal is initiated according to the signal pattern A.

After a certain time, as required to pass the signal, a logical "1" signal occurs, in accordance with the signal pattern D, at the junction 18 and consequently at timing element 34, which as a result is triggered. Immediately, thereupon, the logical "1" output signal of timing element 34, in accordance with signal pattern B, disables AND gate 36, to terminate energization of input terminal 14 of control channel 16, in accordance with signal pattern C.

When considering the time relationships of these operating sequences, it is assumed that only the transmission times of the logical "1" signals from energizing input terminal 14 and de-energizing input terminal 15 through the circuitry of control channel 16 and across the output amplifier are, within a given time, to be taken into account, and all other electronic components of the disclosed circuit arrangements are not noticeably influenced as far as delay times are concerned.

Accordingly, after the logical "1" signal coming from the pulse generator 22 has been blocked at the AND gate 36, the voltage at junction 18 corresponding to the signal pattern D in FIG. 3, whose leading edge coincides in time with that of the triggered timing element 34, still continues to be present past the duration of the signal-passage time and then disappears.

However, timing element 34 continues to supply power past the moment of the voltage drop at the junction 18 and for the duration of the delay time provided by timing element 34, a logical "1" signal is fed to the inverted input terminal 37 of AND gate 36.

Since the duration of the logical "1" signal supplied by timing element 34 lasts longer than that of the logical "1" signal coming from the pulse generator, which means that the trailing edge of the signal pulse of signal pattern B, as supplied by the timing element 34, follows in time that of the signal pulse of signal pattern A, as supplied by the pulse generator 22, a second excitation of the control channel 16 by a subsequent logical "1" signal from the pulse generator 22 is precluded, because AND gate 36 remains disabled during the entire delay period of timing element 34.

Figure 4:
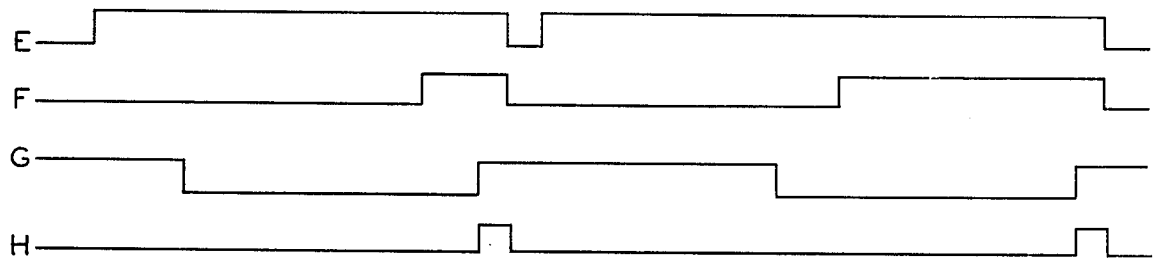
FIG. 4 is a graph showing waveforms representing appropriate time lapses when performing a de-energization check in the system according to FIG. 2.

Further, with reference to the FIGS. 2 and 4, let it be assumed that a voltage exists at junction 18, which means that there is at the junction 18 a control signal originating from slipping or locking of the vehicle wheel and which, coming from the sensor 20 and the control channel 16, has been amplified by the output amplifier, so that a checking as to the possibility of performing a de-energization is to be carried out.

The electronic operating sequences in the process of checking as to a possibility of performing a de-energization by means of the circuit arrangement of FIG. 2 basically correspond to the operating sequences as described hereinbefore for a checking as to the possibility of performing an energization, so that there is no need to describe them as fully.

As of the moment of occurrence at junction 18 of a logical "1" signal in the form of a control signal via control channel 16, in accordance with signal pattern E in FIG. 4, the time delay element 35 is simultaneously subjected to this logical "1" signal, so that the delay period of timing element 35 begins to lapse. Upon expiration of the delay period provided by timing element 35, the latter also sends a logical "1" signal, in accordance with signal pattern F, to input 40 of AND gate 39. AND gate 39 is thus enabled to pass a logical "1" signal of the pulse generator, according to signal pattern H, at the moment that the logical "1" signal of the pulse generator, according to signal pattern G arrives at input 41 of AND gate 39. A logical "1" signal from AND gate 39 to the de-energizing input terminal 15 brings about, after the signal-passage time, a short-term low voltage signal at junction 18, in accordance with the signal pattern E. The resultant voltage drop on the output of the time delay element 35 results in immediate loss of the logical "1" output signal from AND gate 39 according to signal pattern F. Consequently, disappearance of the test-pulse at de-energizing input 15, according to the signal pattern H, again leads to cancellation of the shortterm signal during the control signal, in accordance with the signal pattern E.

The delay period of timing element 35 should last, as with the delay period of timing element 34, longer than the logical "1" signal of pulse generator 22.

As already mentioned, the energization and de-energization signals are of such short duration that they have no influence upon the modulator valve magnet 19, which, therefore, remains under the influence of the antiskid control system only.

In a further exemplified embodiment as per FIG. 5, the timing elements 34 and 35 have been replaced by RS flip-flops 42 and 46 with inverted outputs 45 and 49. Both storages 42 and 46 are reset when the output of generator 22 assumes a logical "1" level, since each is directly connected therewith via its reset input terminal.

In contrast with FIG. 1, however, the set inputs are dominant, that is, have priority with respect to the reset inputs.

If now there is a logical "1" signal at junction 18 in FIG. 5, then, when a high signal is emitted from the pulse generator 22, there is a high signal produced at the negated output 49 of RS flip-flop 46, since its input 47 is inverted and is also the dominating input. Thus, a resetting of the RS flip-flop 46 produces a logical "1" signal on its negated output 49.

Thus, by controlling the de-energizing input 15, there is provided a checking as to the possibility of effecting a de-energization of modulator valve device 19.

When there is a logical "0" signal at junction 18 and at the same time there is a logical "1" signal supplied by pulse generator 22, there occurs a logical "1" signal on the negated output 45 of flip-flop 42, which acts via AND gate 50 to energize energizing input 14 of control channel 16, so as to check as to the possibility of effecting an energization of modulator valve magnet 19.

In the case of a properly functioning electronic antiskid system, activation of the warning device 12 does not occur, since a logical "1" signal past the AND gates 50 and 53 disappears before the delay period of timing element 25 in evaluation circuit 8 is exceeded.

Figure 9:
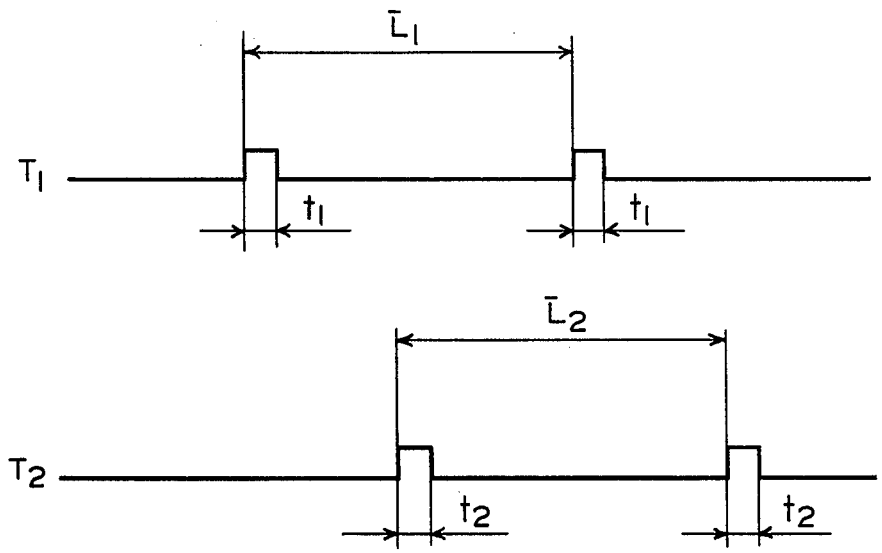
FIG. 9 is a graph representing the timed cycle sequence and duration of the test pulses of the test-pulse generating circuit according to FIGS. 6 to 8.

The test circuit 1 of the FIGS. 6, 7 and 8 is provided, unlike the test circuit of FIGS. 1, 2 and 5, with a pulse generator 23 which, in accordance with the signal patterns shown in FIG. 9, supplies identical pulses $T_1$ and $T_2$, respectively, which in relation to one another are displaced in time and which, in the form of test signals, are transmitted directly to the energizing input terminal 14 and the de-energizing input terminal 15 as well as to the evaluation circuits 9, 10 and 11.

The duration these test pulses $T_1$ and $T_2$ are at a logical "1" level is substantially shorter than the corresponding reaction times or response times of magnets 19 for the respective modulator valves. The pulses $T_1$ and $T_2$ are not allowed to overlap each other, but must follow each other at certain time intervals.

The pulses $T_1$ and $T_2$ are combined with the logical "1" signals derived from the junction 18 by means of the AND gate 57 and the NOR gate 60, respectively.

The output amplifier 17 is activated by the logical "1" signal of pulse $T_1$ and flip-flop 63 in FIG. 6 is set, since the set input 64 of flip-flop 63 is also presented a logical "1" signal by AND gate 57, whose inputs 58 and 59 are simultaneously presented with a logical "1" signal, as a result of pulse $T_1$ and the output amplifier signal.

On the other hand, a logical "1" signal of pulse $T_2$ deactivates terminal amplifier 17, as a result of which flip-flop 63 is reset via NOR gate 60 in response to logical "0" signals being simultaneously present on its inputs 61 and 62.

When the electronic antiskid system operates with a malfunction, the monostable flip-flop stage 67 installed after flip-flop 63 is, via the trigger input 68, triggered anew by output 66 of flip-flop 63, always at a time such that a set delay time of the monostable flip-flop stage 67 cannot start to lapse.

However, if a malfunction should occur, then there would no longer follow a triggering of the monostable flip-flop stage, the set delay time would elapse entirely and the warning device 12 would indicate the error.

In any case the set delay time of the monostable flip-flop stage must be longer than the time intervals, i.e., the cycle duration $t_1$ of the pulses $T_1$ with which the triggering takes place.

In the exemplified embodiment of the evaluation circuit 10 of FIG. 7, the RS type flip-flop 63 in FIG. 6 is replaced by a JK type flip-flop 71 and an OR gate 70 associated therewith.

Logical "1" signals coming separately from AND gate 57 and NOR gate 60 respectively can pass via OR gate 70 of FIG. 7, and activate the JK flip-flop 71.

Accordingly, the pulsing time at the trigger input 72 of the JK flip-flop 71 is determined by the time sequence of the pulses $T_1$ and $T_2$ of pulse generator 23.

The JK flip-flop 71 then responds to each logical "1" signal coming from OR gate 70 by changing the potential from a logical "1" to a logical "0" signal and conversely at the output terminal 73.

The following operating cycle of the monostable flip-flop stage 67 then corresponds, with respect to timing, to that of the same flip-flop stage in evaluation circuit 9 of FIG. 6.

Finally, in the evaluation circuit 11 of FIG. 8, instead of a JK type flip-flop 71, with an associated monostable flip-flop stage 67, there is provided an exclusive OR gate 77 and an associated timing element 78, the exclusive OR gate 77 being — in addition to being controlled by the OR gate 70 — correspondingly controlled at the same time by the high signal of the pulse $T_1$ or of the pulse $T_2$ coming from the respective junctions 74 or 75 through an OR gate 76.

The exclusive OR gate 77 delivers a low signal each time both inputs on the side of the OR gates 70 and 76 have the same potential, i.e., when there is on both either a high signal or a low signal. If there are different input signals on the exclusive OR gate 77, the output of the latter provides a high signal.

This can be the case, when the control channel 16 and output amplifier 17 function without malfunctioning.

If a malfunction should occur in the control channel 16 or in output terminal amplifier 17, the respective test pulses supplied by the pulse generator cannot be reproduced at junction 18 or at the respective subsequent electronic components in the evaluation circuit 11, so that for the total duration of the high signals coming from the pulse generator, there would be a high signal on the output of the exclusive OR gate 77 and, as a result, the delay time of the timing element 78 would be exceeded, and so the warning device 12 would be activated and signal an error, just as in the case of the evaluation circuits 8, 9 and 10 in the manner as described hereinbefore.

Having now described the invention what we claim as new and desire to secure by Letters Patent, is:

1. A test circuit for periodically monitoring the operational reliability of an electronic antiskid brake control system in which an electro-pneumatic modulator valve device influences the fluid brake pressure of a vehicle, such as a road vehicle, independently of the operator, in response to wheel behavior signals transmitted from a wheel sensor to an electronic control channel having an output amplifier via which a control signal is connected to the modulator valve device, said test circuit comprising:
   (a) pulse generator means for emitting a periodic pulse signal;
   (b) warning means operatively responsive to the presence of said periodic pulse signal for a predetermined time duration for issuing a warning signal indicative of an impending malfunction of said control channel or said output amplifier;
   (c) said control channel being normally operatively responsive to said periodic pulse signal for injecting in said control signal an impulse signal having a voltage level corresponding to the opposite digital logic state of said control signal indicative of said control channel and said output amplifier being capable of providing said control signal at a voltage level representative of said opposite digital logic state; and
   (d) evaluation means responsive to said injected impulse signal for nullifying said periodic pulse signal at said warning means to prevent operation thereof prior to expiration of said predetermined time duration.

2. The test circuit as recited in claim 1, further comprising a switch via which a source of power is connected to said pulse generator means to effect activation thereof, said switch being controlled in accordance with the application and release of the vehicle brakes.

3. The test circuit as recited in claim 1, further characterized in that said control channel is provided with an energizing input and a de-energizing input, and said evaluation means includes first and second flip-flop circuits each having a set input subjected to said periodic pulse signal, a reset input subjected to said control signal, said set and reset inputs of said second flip-flop circuit being arranged to invert the signal thereat, and an output via which said periodic pulse signal is connected respectively to said energizing and said de-energizing inputs and to said warning means in the absence of said injected impulse in said control signal.

4. The test circuit as recited in claim 3, wherein said warning means include:
   (a) an OR gate having each input thereof connected to a respective one of said first and second flip-flop circuits;
   (b) a warning device connected to said OR gate; and
   (c) timing means interposed between said OR gate and said warning device to provide said predetermined time duration.

5. The test circuit as recited in claim 1, further characterized in that said control channel is provided with an energizing input and a de-energizing input, and said evaluation means includes;
   (a) first and second AND gates each having one input subjected to said control signal, said one input of said first AND gate being arranged to invert the signal thereat, another input subjected to said periodic pulse signal, and an output via which said periodic pulse signal is connected respectively to said energizing and said de-energizing inputs of said control channel and to said warning means in the absence of said injected impulse in said control signal,
   (b) first signal delay means interposed between said output amplifier and said one input of said first AND gate for delaying disappearance of said control signal therefrom; and
   (c) second signal delay means interposed between said output amplifier and said one input of said second AND gate for delaying connection of said control signal thereto.

6. The test circuit as recited in claim 5, further characterized in that the delay time of said first and second signal delay means is shorter than a full cycle duration of said periodic pulse and longer than a positive half-cycle duration thereof.

7. The test circuit as recited in claim 5, wherein said warning means comprises:
   (a) an OR gate having each input thereof connected to a respective one of said outputs of said first and second AND gates;

(b) a warning device connected to the output of said OR gate; and (c) timing means interposed between said OR gate and said warning device to provide said predetermined time duration.

8. The test circuit as recited in claim 1, further characterized in that said control channel is provided with an energizing input and a de-energizing input, and said evaluation means comprises:

(a) first and second flip-flop circuits each having a set input subjected to said control signal, a reset input subjected to said periodic pulse signal, and a negated output, said set input of said second flip-flop circuit being arranged to invert control signal thereat; and (b) first and second AND gates each having one input connected to said negated output of a respective one of said flip-flop circuits, another input subjected to said periodic pulse signal, and an output via which said periodic pulse signal is connected respectively with said energizing and said de-energizing inputs of said control channel and with said warning means in the absence of said injected impulse in said control signal.

9. The test circuit as recited in claim 8, wherein said warning means comprises:

(a) an OR gate having each input thereof connected to a respective one of said outputs of said first and second AND gates;

(b) a warning device connected to the output of said OR gate; and (c) timing means interposed between said OR gate and said warning device to provide said predetermined time duration.

10. The test circuit as recited in claim 1, further characterized in that said injected pulse signal is shorter in duration than said periodic pulse signal and the response time of said modulator valve device.

11. The test circuit as recited in claim 1, further characterized in that said control channel is provided with an energizing input and a de-energizing input and said pulse generator means is provided with first and second outputs via which said periodic pulse signal is connected directly to said energizing and de-energizing inputs of said control channel.

12. The test circuit as recited in claim 11, further characterized in that said injected impulse signal corresponds in duration to said periodic pulse signal.

13. The test circuit as recited in claim 11, wherein said evaluation means comprises:

(a) an AND gate subjected to said control signal and to said periodic pulse signal effective at said first output of said pulse generator means;

(b) a NOR gate subjected to said control signal and to said periodic pulse signal effective at said second output of said pulse generator means;

(c) a signal inverter for reversing the digital logic state of said periodic pulse signal at said NOR gate;

(d) a first flip-flop circuit having a set input subjected to the output of said AND gate, an reset input subjected to the output of said NOR gate, and an output; and (e) a second flip-flop circuit having a trigger input subjected to the output of said first flip-flop circuit and an output connected to said warning means to provide said periodic pulse signal thereat only in the absence of said injected impulse of said control signal.

14. The test circuit as recited in claim 13, further characterized in that said second flip-flop circuit is monostable, thereby providing said predetermined time duration, said predetermined time duration exceeding the time interval between successive pulses of said periodic pulse signal at the respective first and second outputs of said pulse generator means.

15. The test circuit as recited in claim 11, further characterized in that successive pulses of said periodic pulse signal at said first output of said pulse generator means occurs between successive pulses of said periodic pulse signal at said second output thereof.

16. The test circuit as recited in claim 11, wherein said evaluation means comprises:

(a) an AND gate subjected to said control signal and to said periodic pulse signal effective at said first output of said pulse generator means;

(b) a NOR gate subjected to said control signal and to said periodic pulse signal effective at said second output of said pulse generator means;

(c) a signal inverter for reversing the digital logic state of said periodic pulse signal at said NOR gate;

(d) an OR gate subjected to the outputs of said AND gate and said NOR gate;

(e) a first flip-flop circuit having a trigger input subjected to the output of said OR gate and an output whose logical condition alternates with the logical condition of the signal at the trigger input thereof; and (f) a second flip-flop circuit having a trigger input subjected to the output of said first flip-flop circuit and an output connected to said warning means, the logical condition thereof varying with the logical condition of the trigger input thereof, so as to reflect a logical "1" condition only in the absence of said injected impulse in said control signal.

17. The test circuit as recited in claim 16, further characterized in that said second flip-flop circuit is monostable, thereby providing said predetermined time duration, said predetermined time duration exceeding the time interval between successive pulses of said periodic pulse signal at the first and second outputs of said pulse generator means.

18. The test circuit as recited in claim 11, wherein said evaluation means comprises:

(a) an AND gate subjected to said control signal and to said periodic pulse signal effective at said first output of said pulse generator means;

(b) a NOR gate subjected to said control signal and to said periodic pulse signal effective at said second output of said pulse generator means;

(c) a signal inverter for reversing the digital logic state of said periodic pulse signal at said NOR gate;

(d) first OR gate subjected to the outputs of said AND gate and said NOR gate;

(e) a second OR gate subjected to said periodic pulse signal at said first and second outputs of said pulse generator means;

(f) an exclusive OR gate subjected to the outputs of said first and second OR gates; and (g) timing means via which the output of said exclusive OR gate is connected to said warning means to provide said predetermined time duration before said warning means is operated in response to the absence of said injected impulse of said control signal.

19. The test circuit as recited in claim 18, further characterized in that said predetermined time duration exceeds the time interval between successive pulse of said periodic pulse signal at the first and second outputs of said pulse generator means.

* * * * *